US008665584B2

(12) United States Patent
Pence

(10) Patent No.: US 8,665,584 B2
(45) Date of Patent: Mar. 4, 2014

(54) TABLET HOLDER AND TABLET STOWAGE SYSTEM

(75) Inventor: Tracy N. Pence, King, NC (US)

(73) Assignee: BE Aerospace, Inc., Wellington, FL (US)

( * ) Notice: Subject to any disclaimer, the term of this patent is extended or adjusted under 35 U.S.C. 154(b) by 169 days.

(21) Appl. No.: 13/368,532

(22) Filed: Feb. 8, 2012

(65) Prior Publication Data

US 2012/0206867 A1 Aug. 16, 2012

Related U.S. Application Data

(60) Provisional application No. 61/441,408, filed on Feb. 10, 2011.

(51) Int. Cl.
*G06F 1/16* (2006.01)

(52) U.S. Cl.
USPC ............ 361/679.02; 361/679.56; 248/289.11; 206/320; 206/701

(58) Field of Classification Search
USPC .................................................... 361/679.02
See application file for complete search history.

(56) References Cited

U.S. PATENT DOCUMENTS

| | | | | |
|---|---|---|---|---|
| 6,646,866 | B2* | 11/2003 | Kao ........................ | 361/679.26 |
| 7,121,514 | B2* | 10/2006 | Twyford ................... | 248/177.1 |
| 7,325,891 | B1* | 2/2008 | Kinsley et al. ............ | 312/257.1 |
| 7,369,401 | B1 | 5/2008 | Floersch et al. | |
| 7,464,814 | B2* | 12/2008 | Carnevali ................... | 206/320 |
| D643,433 | S * | 8/2011 | Hsieh et al. ................. | D14/440 |
| 8,453,835 | B2* | 6/2013 | So ............................. | 206/320 |
| 2002/0050771 | A1* | 5/2002 | Krispin et al. ............ | 312/223.2 |
| 2002/0190172 | A1* | 12/2002 | Oddsen, Jr. ............. | 248/289.11 |
| 2004/0118743 | A1* | 6/2004 | Yang et al. ............... | 206/701 |
| 2007/0235370 | A1* | 10/2007 | Reale ......................... | 206/701 |
| 2009/0268385 | A1* | 10/2009 | Harbin et al. ............ | 361/679.02 |
| 2010/0006468 | A1* | 1/2010 | Lin ............................. | 206/522 |
| 2010/0078343 | A1* | 4/2010 | Hoellwarth et al. .......... | 206/320 |
| 2010/0258695 | A1* | 10/2010 | Wu ........................... | 248/289.11 |
| 2012/0008269 | A1* | 1/2012 | Gengler ................... | 361/679.09 |
| 2012/0087074 | A1* | 4/2012 | Chen ........................ | 361/679.02 |

FOREIGN PATENT DOCUMENTS

NL 2002281 6/2010
WO 2004051135 A1 6/2004

OTHER PUBLICATIONS

International Search Report for PCT/US2012/024302 dated Jan. 14, 2013.

* cited by examiner

*Primary Examiner* — Anthony Q Edwards
(74) *Attorney, Agent, or Firm* — Shumaker, Loop & Kendrick, LLP

(57) ABSTRACT

A tablet holder including a frame configured to hold a tablet. A barrel is defined in the frame and opens through one side of the frame. A mounting post is pivotally and retractably received within the barrel, and a locking mechanism is provided for locking the mounting post against relative movement. A tablet stowage system includes a tablet holder, a container for stowing a plurality of tablet holders, and a galley cart for stowing the container.

8 Claims, 6 Drawing Sheets

TABLET HOLDER AND TABLET STOWAGE SYSTEM

CROSS-REFERENCE TO RELATED APPLICATION

This application claims priority to U.S. Provisional Patent Application No. 61/441,408 filed Feb. 10, 2011, the contents of which are incorporated by reference herein.

TECHNICAL FIELD AND BACKGROUND OF THE INVENTION

1. Field of the Invention

The present invention relates generally to holders, protectors and stowage systems for tablets and like devices, and more particularly, to a tablet holder having a retractable mounting post for console mounting in a vehicle and systems for stowing multiple tablets when not in use.

2. Background of the Invention

Tablets and like Portable Electronic Devices (PEDs) are becoming more commonplace due to the increased needs for portable computing, remote communication and access to media content. Tablets, such as the iPad® offered for sale by Apple®, are preferred over cell phones and personal digital assistants due to their large screen size and high definition resolution, and are preferred over conventional laptops due to their compactness, lightweight and lack of a keyboard and mouse.

Tablets, while designed to be easily held for touchscreen use, lack mounting structure or structure to mount thereto to hold the tablet in place for prolonged use or for hands-free viewing. This is particularly disadvantageous when using a tablet in a vehicle such as an airplane, train or car where the tablet may be used, in part, as a replacement for a permanently-mounted dedicated video monitor. With regard to tablet use in an airplane in particular, where passengers may have the option of using an airline-supplied tablet during a flight, and wherein simultaneous use of other accessories such as tray tables often occurs, such use requires consideration of tablet protection, holding, mounting and stowage both during use and between flights.

Accordingly, it would be desirable to provide a tablet holder that both protects the tablet and allows it to be mounted to supporting structure for hands-free use. It is further desirable to provide a tablet stowage system for storing multiple tablets when not in use.

BRIEF SUMMARY OF THE INVENTION

According to one embodiment, a tablet holder is provided herein including a frame configured to cover the corners and a majority portion of the backside of a tablet, a barrel defined in the frame and opening through one side of the frame, a mounting post pivotally and retractably received within the barrel, and a locking mechanism for locking the mounting post against relative movement.

The barrel may be positioned rearward of the backside of the tablet when installed within the frame such that the frame has a width about equal to that of the tablet. The frame may further include one or more openings therethrough corresponding in position with one or more of control buttons and connectors of the tablet such that the tablet controls can be operated and connections can be made through the frame, such as a power connection, headphone connection, etc.

The locking mechanism may include one or more locking levers mounted on the backside of the frame for pivotal movement transverse to the mounting post. The one or more locking levers may include a cam on the lever engageable in a locking position of the lever for applying locking force to the mounting post to lock the mounting post against the relative movement. In the case of more that one locking lever for the same mounting post, the locking levers may be spaced apart.

The mounting post may be configured to be received within an opening within a seat console such that the mounting post supports the tablet in a desirable viewing position, and allows the tablet to pivot with respect to the seat console along an axis transverse to the longitudinal axis of the mounting post, and along an axis coaxial with the longitudinal axis of the mounting post.

The frame may cover a majority portion of the periphery of the tablet with the exception of the screen so as to securely hold and protect the tablet without obstructing the viewing screen.

The frame may include a first barrel positioned adjacent the left side of the frame and a second barrel positioned adjacent the right side of the frame to provide a universal frame with left- and right-handed mounting. The first and second barrels may be parallel to one another and open through the same side of the frame.

According to another embodiment, a tablet stowage system is provided herein including a plurality of tablets each installed within a tablet holder, a container for stowing a plurality of tablet holders including their tablets, and a portable galley cart for stowing the container and facilitating delivery/collection of the tablets.

Each tablet holder may include a frame configured to cover the corners and a majority portion of the backside of the tablet, a barrel defined in the frame and opening in the direction of one side of the frame, a mounting post pivotally and retractably received within the barrel, and a locking mechanism for locking the mounting post against relative movement.

The tablet stowage system may further include a plurality of passenger seat consoles, with each of the plurality of seat consoles including an opening for receiving the mounting post of a tablet holder. The mounting post may be configured to pivot with respect to the seat console along an axis transverse to the longitudinal axis of the mounting post, and pivot with respect to the seat console along an axis parallel to the longitudinal axis of the mounting post to adjust the viewing position of the tablet.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
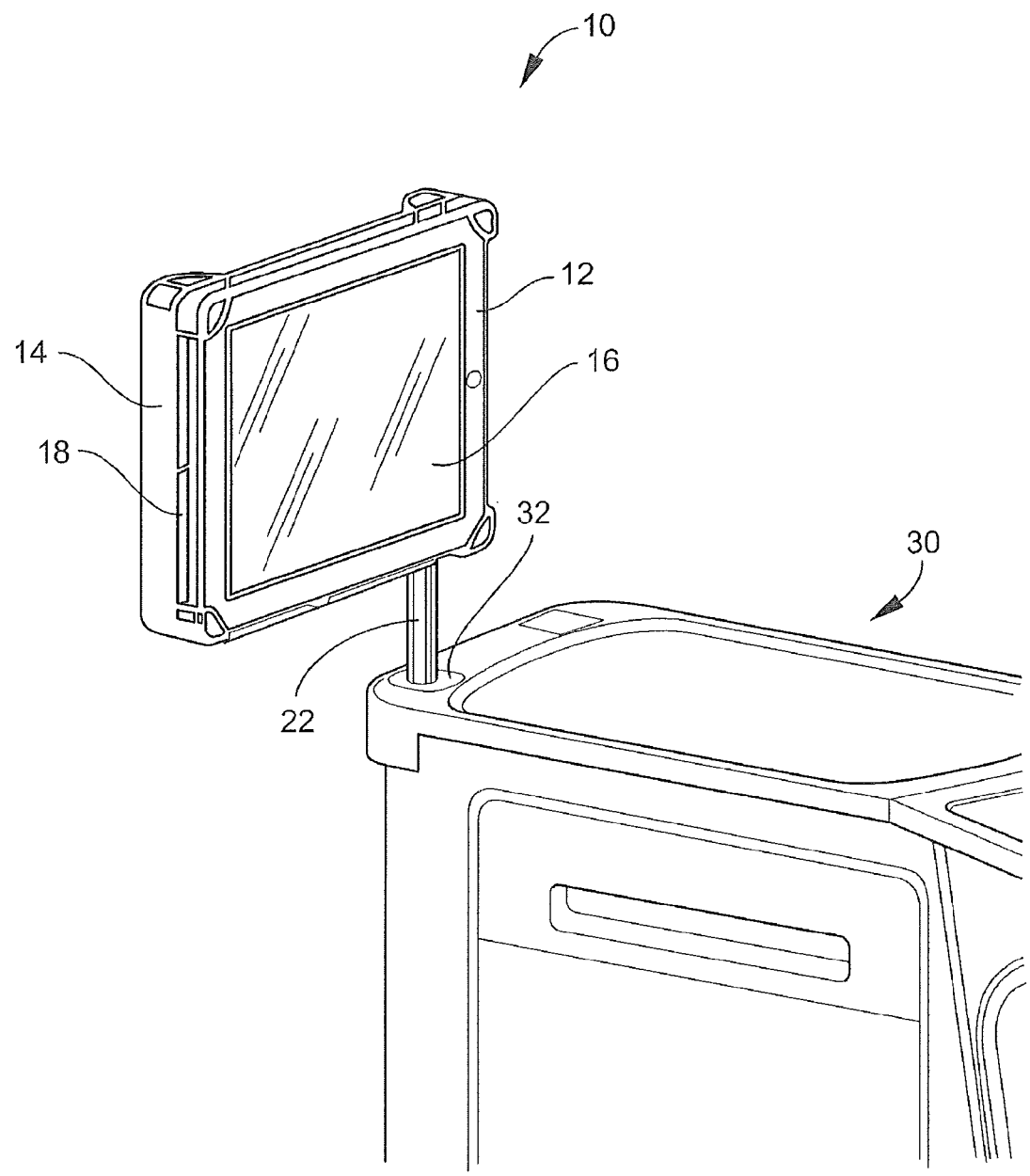
FIG. 1 is a forward-facing view of an exemplary embodiment of a tablet holder shown supported by a seat console.
Figure 2:
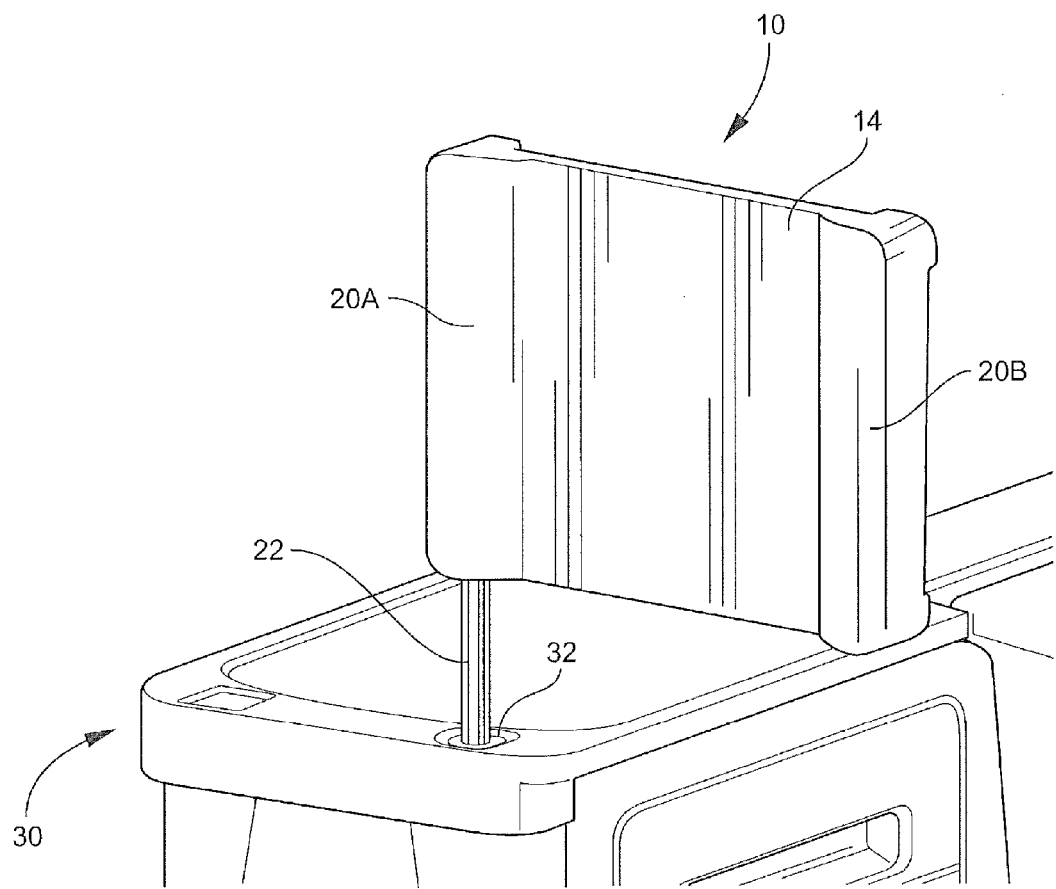
FIG. 2 is an aft-facing view of the tablet holder shown in FIG. 1.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Described herein is an exemplary embodiment of a tablet holder and tablet holder stowage system for use on a vehicle, such as an aircraft. The tablet holder described herein advantageously protects the tablet against impact damage, and allows that tablet to be removably and adjustably mounted on a seat console or like supporting structure, such as for hands-free or prolonged use. In a specific embodiment, provided herein are airline carrier supplied tablets and tablet holders for use by passengers during a flight, and tablet and tablet holder stowage systems for storing tablets when not in use.

The tablet holder provided herein, when mounted on the seat console, advantageously positions the tablet out of the way of the use of other seat accessories, such as a tray table. The tablets within their holders may be distributed after taxi and take-off, and collected prior to landing in order to be taxi, take-off and landing compliant. In another embodiment, the tablets securely mount to the seat console in taxi, take-off and landing compliant manner. When not in use, tablets within their holders may be stored within containers, and the containers may be stored within a conventional galley cart to facilitate collection and distribution.

Referring to the figures, one embodiment of a tablet holder is shown generally at reference numeral 10. Tablet holder 10 is sized to receive and securely hold a tablet or like device shown generally at reference numeral 12. The table holder includes a frame 14 sized slightly larger than the tablet 12. The frame 14 is configured to cover the corners and a majority portion of the backside of a tablet 12, but not obstruct the screen 16 of the tablet. The corners are preferably covered so that the tablet 12 cannot be removed from the front or through any side of the frame 14. The frame 14 may have a two or more part construction so that the frame pieces are installed around the tablet 12, securely maintaining the tablet within the frame 14.

The frame 14 may have one or more openings 18 therethrough corresponding in position with one or more of control buttons and connectors of the tablet 12 such that the tablet controls can be operated and connections made through the frame, such as power connections, headphone connections, etc. The frame 14, as well as other components of the tablet holder 10, may be constructed from lightweight aluminum, aircraft-grade plastics, carbon fiber resins and like materials, chosen for their strength, durability and lightweight.

The frame 14 includes at least one barrel defined in the frame that opens through one side of the frame. The barrel may be defined by the frame 14 itself, or may be a tubular member secured within the frame. As shown in FIGS. 1-5, the frame includes two barrels 20A and 20B, both opening through the bottom of the frame 14, to provide a universal frame offering the option of both left-handed and right-handed mounting. It is envisioned that the barrels 20A and 20B may open through a different common side of the frame or through different sides of the frame to provide a universal holder for accommodating a variety of tablet designs and mounting configurations.

As shown, the frame 14 includes a first barrel 20A positioned adjacent the left side of the tablet holder 10 when viewed from the backside, and a second barrel 20B positioned adjacent the right side of the tablet holder 10 when viewed from the backside. The barrels 20A and 20B are preferably positioned rearward of the tablet to limit the width of the frame 14. Unused or unoccupied barrels may be covered with a plug.

A mounting post 22 is pivotally and retractably received within the barrel 20A. The mounting post 22 has a diameter sized slightly smaller than the diameter of the barrel 20A such that the mounting post 22 is able to slide and rotate relative to the barrel with minimal play therebetween to provide stable tablet positioning. The mounting post 22 may have a length about equal to the length of the barrel 20A. In an alternative embodiment, the mounting post 22 may be adjustable to achieve a length longer than the length of the barrel, such as using telescoping members or the like. The mounting post may terminate in a connector 40, such as a connector for powering the tablet 12. The connector may engage a connector inside the console as described below.

Figure 5:
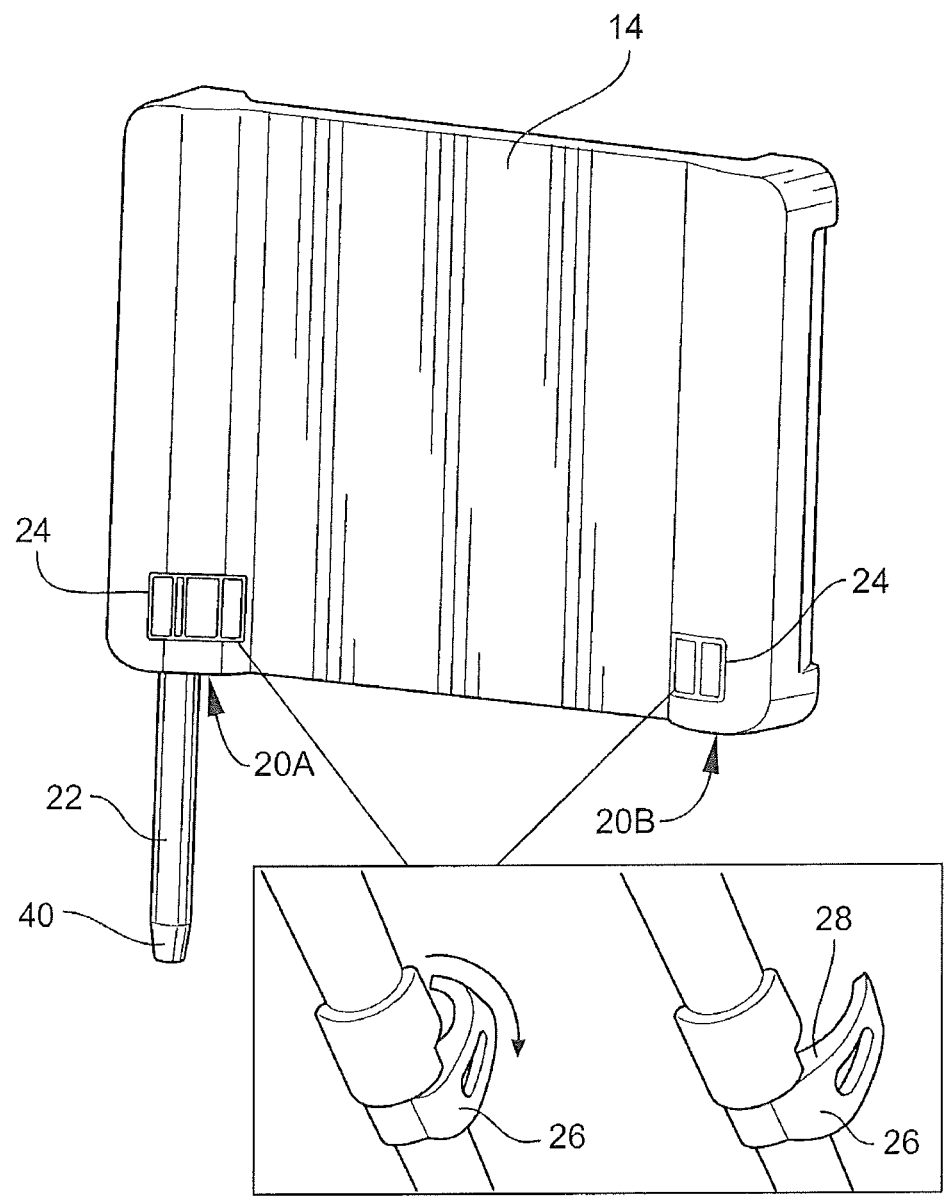
FIG. 5 is a detailed view of the back of the tablet holder showing alternative retractable post mounting positions and locking mechanisms.

Referring to FIG. 5, the tablet holder 12 further includes a locking mechanism 24 for locking the mounting post 22 against relative movement. The tablet holder 12 may include one locking mechanism 24 per post, or may include spaced locking mechanisms 24 for each post. The locking mechanism 24 as shown includes a locking lever 26 mounted on the backside of the frame 14 for pivotal movement transverse to the longitudinal axis of the mounting post 22. The locking mechanism 24 may include a cam 28 on the lever 26 engageable in a locking position of the lever 26 for applying locking force to the mounting post 22 to lock the mounting post against relative movement. Thus, the locking mechanism 24, when locked, prevents the mounting post 22 from pivoting and retracting relative to the barrel and frame 14.

The pressure from the lever 26 is preferably great enough to prevent relative movement of the mounting post 22, but small enough to cause the lever 26 to deform or excessively wear the mounting post. The manual actuation of the locking lever 26 preferably remains smooth with relatively low effort required. The lever 26, when in the fully locked position, may be positioned substantially slush with the backside of the frame 14.

Figure 3:
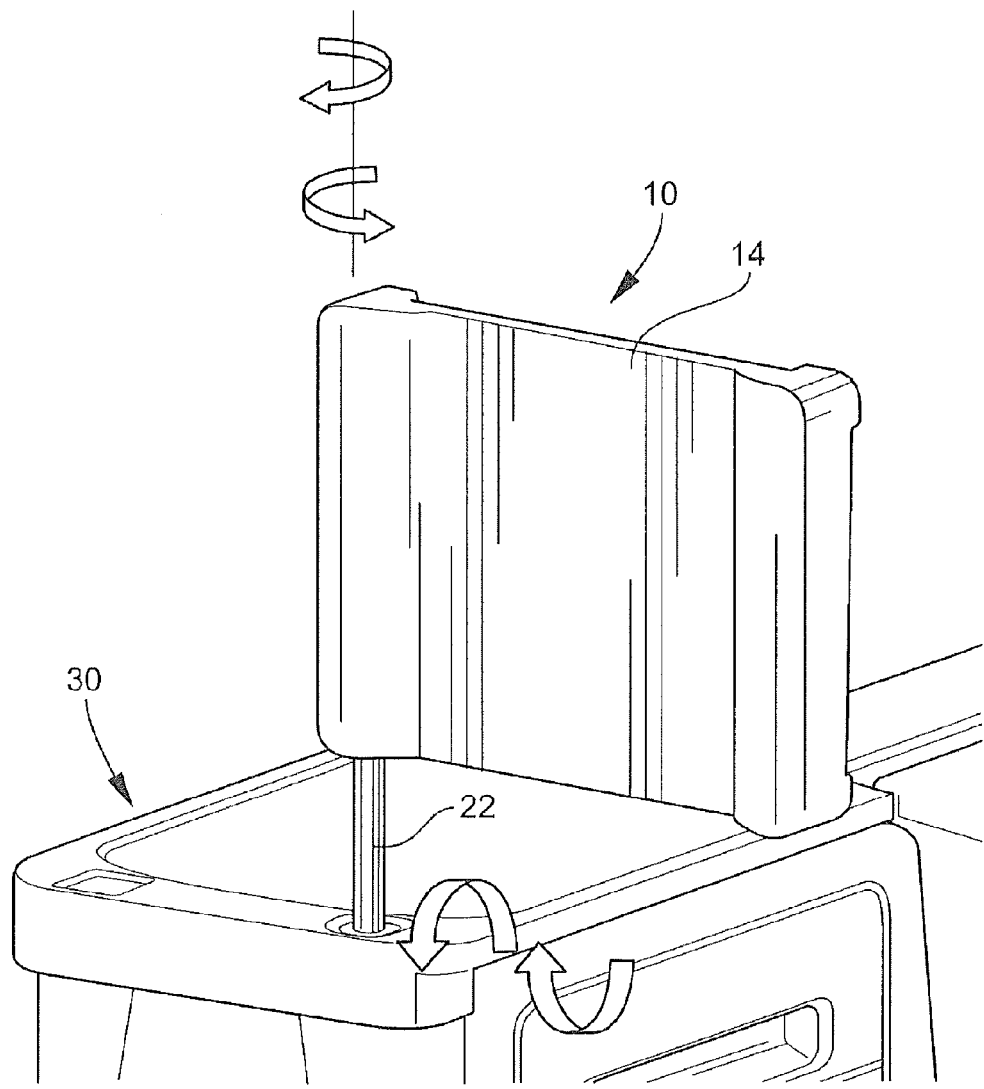
FIG. 3 is an aft-facing view of the tablet holder and console showing the axes of rotation of the tablet holder with respect to the seat console.
Figure 4:
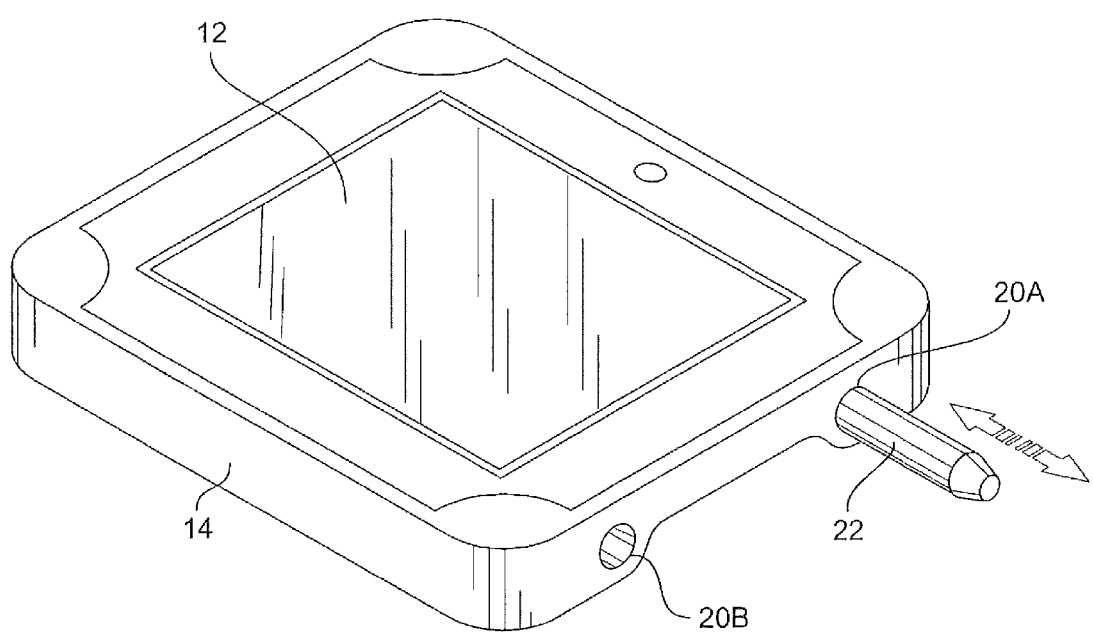
FIG. 4 is an isolated view of the tablet holder shown in FIG. 1 showing the retractable mounting post.

Referring again to FIGS. 1-3, the mounting post 22 is used to mount the tablet 12 to a supporting structure, such as the passenger seat console shown generally at reference numeral 30. The seat console 30 defines one or more openings 32 sized to receive the mounting post 22. As shown, the openings 32 extend from the top surface of the seat console 30 generally downwards in the direction of the floor. The mounting post 22 is used to adjustably position the tablet 12 in a desirable viewing position. Referring specifically to FIG. 3, the mounting post 22 is configured to pivot with respect to the seat console 30 along an axis transverse to the longitudinal axis of the mounting post to tilt the tablet 12, and pivot with respect to the seat console 30 along an axis coaxial with the longitudinal axis of the mounting post to rotate the tablet 12. The frame 14 is also configured to pivot with respect to the mounting post 22 and move vertically with respect to the seat console 30.

Figure 7:
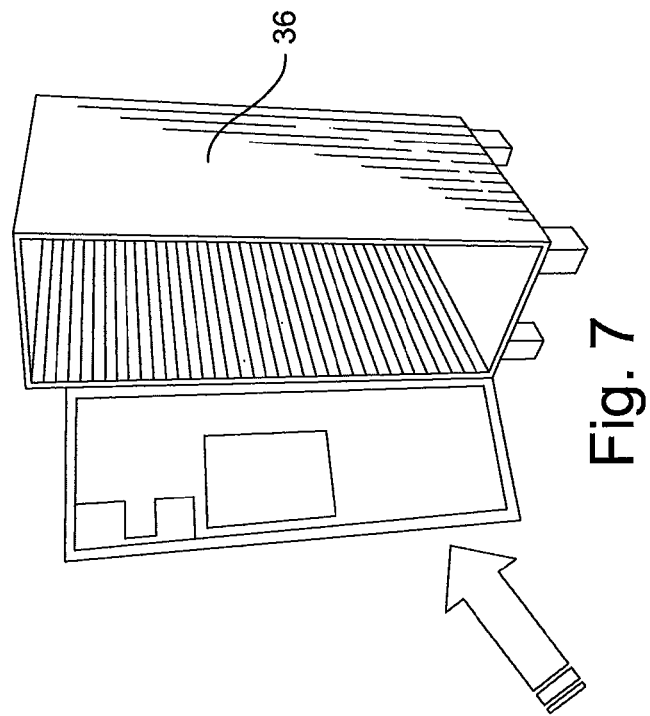
FIG. 7 is a galley cart for storing one or more tablet containers.
Figure 6:
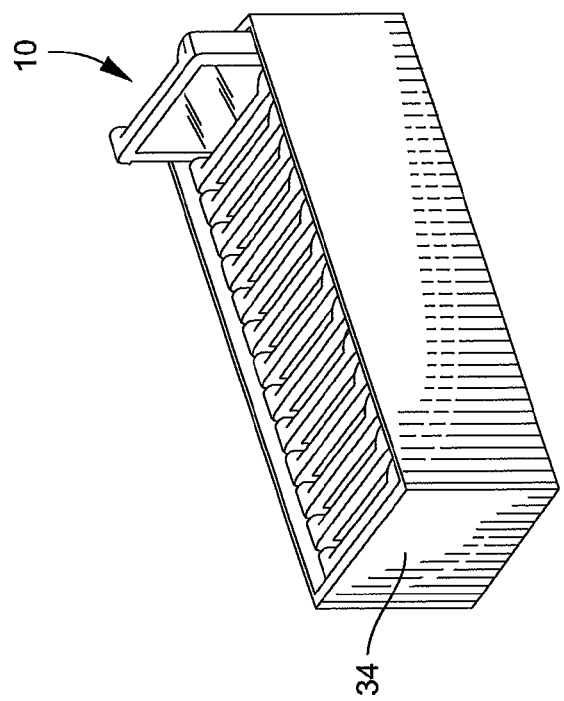
FIG. 6 is a tablet container for stowing a plurality of tablet holders and tablets when not in use.

Referring to FIGS. 6 and 7, a tablet stowage system is provided herein including a plurality of tablets 12 each installed within a tablet holder 10, a container 34 for stowing a plurality of tablet holders 10 including their tablets 12, and a portable galley cart 36 for stowing the container 34 and facilitating delivery/collection of the tablets 12.

The tablets 12 may be supplied by the airline carrier and used during a flight. The tablets 12 may be distributed after take-off and collected prior to landing. The mounting post 12 of each tablet is preferably retracted before stowing to facilitate compact, organized stowing as shown in FIG. 6. The galley cart 36 may stow one or more containers 34.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. A tablet holder, comprising:
    (a) a frame configured to hold a tablet;
    (b) a barrel defined in the frame and opening through one side of the frame;
    (c) a mounting post pivotally and retractably received within the barrel; and
    (d) a locking mechanism for locking the mounting post against movement relative to the frame.

2. The tablet holder according to claim 1, wherein the barrel is positioned rearward of a backside of the tablet when installed within the frame.

3. The tablet holder according to claim 1, wherein the frame includes one or more openings therethrough corresponding in position with one or more of control buttons and connectors of the tablet.

4. The tablet holder according to claim 1, wherein the locking mechanism includes a locking lever mounted on the backside of the frame for pivotal movement transverse to the mounting post.

5. The tablet holder according to claim 4, wherein the locking mechanism includes a cam on the lever engageable in a locking position of the lever for applying locking force to the mounting post to lock the mounting post against movement relative to the frame.

6. The tablet holder according to claim 1, wherein the mounting post is configured to be received within an opening within a seat console and the mounting post is configured to pivot with respect to the seat console along an axis transverse to the longitudinal axis of the mounting post.

7. The tablet holder according to claim 1, wherein the frame is configured to cover the corners and a majority portion of a backside of the tablet.

8. The tablet holder according to claim 1, wherein the frame includes a first barrel positioned adjacent the left side of the frame and a second barrel positioned adjacent the right side of the frame, and wherein the first and second barrels are parallel to one another and open through the same side of the frame.

* * * * *